(12) United States Patent
Haun et al.

(10) Patent No.: US 6,414,829 B1
(45) Date of Patent: Jul. 2, 2002

(54) ARC FAULT CIRCUIT INTERRUPTER

(75) Inventors: Andy A. Haun; Brian G. Grattan; Kon B. Wong, all of Cedar Rapids; Robert F. Dvorak, Mt. Vernon; Gary W. Scott, Mount Vernon, all of IA (US)

(73) Assignee: Square D Company, Palatine, IL (US)

( * ) Notice: Subject to any disclaimer, the term of this patent is extended or adjusted under 35 U.S.C. 154(b) by 0 days.

(21) Appl. No.: 09/454,565

(22) Filed: Dec. 7, 1999

Related U.S. Application Data

(63) Continuation-in-part of application No. 09/129,685, filed on Aug. 5, 1998, now Pat. No. 6,259,996, which is a continuation-in-part of application No. 09/026,193, filed on Feb. 19, 1998, now Pat. No. 6,246,556.

(51) Int. Cl.$^7$ ................................................. H02H 3/00
(52) U.S. Cl. ....................................................... 361/42
(58) Field of Search ...................... 361/42–50; 324/520, 324/522, 536, 613

(56) References Cited

U.S. PATENT DOCUMENTS

| 4,949,214 | A | * | 8/1990 | Spencer | 361/95 |
|---|---|---|---|---|---|
| 5,452,222 | A | | 9/1995 | Gray et al. | 364/481 |
| 5,537,327 | A | | 7/1996 | Snow et al. | 364/483 |
| 6,031,699 | A | | 2/2000 | Dollar, II et al. | 361/142 |
| 6,040,967 | A | | 3/2000 | DiSalvo | 361/142 |
| 6,052,046 | A | | 4/2000 | Ennis et al. | 335/202 |
| 6,084,756 | A | | 7/2000 | Doring et al. | 361/45 |
| 6,088,205 | A | * | 7/2000 | Neiger et al. | 361/42 |
| 6,191,589 | B1 | | 2/2001 | Clunn | 324/424 |
| 6,198,611 | B1 | | 3/2001 | Macbeth | 361/42 |
| 6,215,378 | B1 | | 4/2001 | Gibson et al. | 335/18 |
| 6,229,679 | B1 | | 5/2001 | Macbeth | 361/42 |
| 6,229,680 | B1 | | 5/2001 | Shea | 361/42 |
| 6,232,857 | B1 | | 5/2001 | Mason, Jr. et al. | 335/18 |

FOREIGN PATENT DOCUMENTS

| CA | 2267490 | 3/1999 | |
|---|---|---|---|
| CA | 2256208 | 6/1999 | |
| CA | 2256243 | 6/1999 | |
| CA | 2277589 | 6/1999 | |
| CA | 2265204 | 12/1999 | |
| CA | 2305910 | 10/2000 | H01H/71/04 |
| CA | 2307812 | 11/2000 | H01H/83/00 |
| EP | 0974995 A2 | 1/2000 | |
| EP | 0981193 A2 | 2/2000 | |
| EP | 1005129 | 5/2000 | |
| WO | WO92/08143 | 5/1992 | |
| WO | WO00/11696 | 3/2000 | |
| WO | WO00/36623 | 6/2000 | |
| WO | WO00/39771 | 7/2000 | |
| WO | WO01/01536 A1 | 1/2001 | H02H/3/00 |

OTHER PUBLICATIONS

JP 06308191, dated Apr. 11, 1994, Abstract.

* cited by examiner

*Primary Examiner*—Ronald W. Leja
(74) *Attorney, Agent, or Firm*—Kareem M. Irfan; Larry I. Golden

(57) ABSTRACT

A system for producing a simulated ground fault when arcing is present in an electrical circuit includes a sensor which monitors the electrical circuit. An arcing fault detection circuit determines whether an arcing fault is present in response to the sensor and produces a trip signal in response to a determination that an arcing fault is present in the electrical circuit. A ground fault simulator circuit produces a simulated ground fault in response to the trip signal.

11 Claims, 4 Drawing Sheets

ARC FAULT CIRCUIT INTERRUPTER

CROSS-REFERENCE TO RELATED APPLICATIONS

This application is a Continuation-In-Part of U.S. patent application Ser. No. 09/129,685, filed Aug. 5, 1998, now U.S. Pat. No. 6,259,996, which is a Continuation-In-Part of U.S. patent application Ser. No. 09/026,193, filed Feb. 19, 1998, now U.S. Pat. No. 6,246,556.

FIELD OF THE INVENTION

The present invention relates to the protection of electrical circuits and, more particularly, to the detection of electrical faults of the type known as arcing faults in an electrical circuit, and more particularly still an arc fault circuit interrupter which creates an apparent ground fault upon arc detection, such that an associated ground fault circuit interrupter can be used to trip the circuit.

BACKGROUND OF THE INVENTION

The electrical systems in residential, commercial and industrial applications usually include a panel board for receiving electrical power from a utility source. The power is then routed through protection devices to designated branch circuits supplying one or more loads. These overcurrent devices are typically circuit interrupters such as circuit breakers and fuses which are designed to interrupt the electrical current if the limits of the conductors supplying the loads are surpassed.

Circuit breakers are a preferred type of circuit interrupter because a resetting mechanism allows their reuse. Typically, circuit breakers interrupt an electric circuit due to a disconnect or trip condition such as a current overload or ground fault. The current overload condition results when a current exceeds the continuous rating of the breaker for a time interval determined by the trip current. A ground fault trip condition is created by an imbalance of currents flowing between a line conductor and a neutral conductor which could be caused by a leakage current or an arcing fault to ground.

Arcing faults are commonly defined as current through ionized gas between two ends of a broken conductor or at a faulty contact or connector, between two conductors supplying a load, or between a conductor and ground. However, arcing faults may not cause a conventional circuit breaker to trip. Arcing fault current levels may be reduced by branch or load impedance to a level below the trip curve settings of the circuit breaker. In addition, an arcing fault which does not contact a grounded conductor or person will not trip a ground fault protector.

There are two types of arcing faults in electrical circuits and wiring: Parallel and Series.

Parallel arcing occurs when there is an arc between two wires or wire-to-ground and the current is limited by the impedance of the voltage source, the wire, and the arc. When the fault is solidly connected and the arc voltage low, the normal breaker trips very quickly with little heating of the wire or damage at the arc point. Occasionally, however, the arc blows apart the faulted components creating a larger arc voltage and reducing the fault current below the trip curve and causing "ticking faults." The consequences of parallel arc damage are usually much greater than series arcs. The average current may not be sufficient to trip a conventional breaker by heating the bimetal strip or the peak current may not be large enough to trigger the magnetic trip latch. This makes the conventional breaker reasonably effective in protecting against parallel arcing when the peak current is a few hundred amps. Unfortunately, the fault current can be limited by a circuit with too much impedance to immediately trip the thermal-magnetic breaker. Parallel arcing is generally more hazardous than series arcing. The energy released in the arc is much higher with temperatures often in excess of 10,000 Deg.F. This causes pyrolyzation or charring of the insulation, creating conductive carbon paths and ejecting hot metal that can encounter flammable materials.

Series arcing begins with corrosion in pin-socket connections or loose connections in series with the electrical loads. The voltage drop across a poor connection begins at a few hundred millivolts and slowly heats and oxidizes or pyrolizes the surrounding materials. The voltage drop increases to a few volts at which time it becomes a "glowing connection" and begins to release smoke from the surrounding polymer insulation. Series arc current is usually limited to a moderate value by the impedance of the electrical load that is connected to the circuit. The amount of power from series arc is typically far is less than in a parallel arc fault. Since the peak current is typically never greater than the design load current, series arcing is much more difficult to detect than parallel arcing. The signature of the series arc is an unusual variation of the normal load current. Series arcing is usually such that the arc current remains well below the trip curve of the breaker. Loose terminal lugs, misarranged or cross-threaded electrical plugs, broken conductor strands inside a wire are typical sources. These arcs cause load voltage drops and heating of the wire, plug pin, or terminal lug. This heating can lead to component failure and ignition sources.

There are many conditions that may cause an arcing fault. For example, corroded, worn or aged wiring, connectors, contacts or insulation, loose connections, wiring damaged by nails or staples through the insulation, and electrical stress caused by repeated overloading, lightning strikes, etc. These faults may damage the conductor insulation and cause the conductor to reach an unacceptable temperature.

Standard overcurrent devices used in circuit breakers respond to the heating effect of current in a resistive wire to "thermal trip" the breaker, but these do not respond to the sputtering arc currents. We propose a better approach—to stop the arc when it happens rather than wait for a circuit breaker to thermal trip. Until recently, such arc detection capability has not been available in circuit breakers or relays. Ground Fault Circuit Interrupters (GFCI) for personnel protection have been available in the home since the early 1970's. Under ideal conditions, GFCI can detect phase to ground arcs as low as six milliamps, but cannot detect series arcs or improve line to neutral fault trip times.

Arc Fault detection technologies are a new and exciting innovation in circuit protection in the U.S. We have found that Arc Fault Circuit Interrupters (AFCI) can be designed to detect a series or parallel arc, as well as line to neutral arcs by "listening" for the unique signatures which arcs generate. An arc fault circuit interrupter is a device intended to provide protection from the effects of arc faults by recognizing characteristics unique to arcing and by functioning to de-energize the circuit when an arc fault is detected.

Conventional circuit breakers have historically been the best available protection for wiring. Today's design standards are based on technologies that are up to 40 years old. In circuit breakers, the protection is usually provided in two ways. Short circuit currents operate a magnetic trip latch, while overload currents operate either a bimetal trip latch or hydraulic damped magnetic plunger. The "instantaneous trip" is the high current magnetic trip action found on some but not all breakers. The time to trip during an overload is determined by the time it takes to heat a bimetal to the temperature that delatches the breaker. The more current that heats the bimetal, the shorter the time it takes to trip the breaker. A hydraulic-magnetic style of breaker contains a magnetic slug sealed in fluid which moves to a trip position in response to the square of the current. These circuit interruption devices are selected by design engineers to protect the wiring from overheating or melting. During arcing faults these currents are often small, short in duration and well below the over current time protection curve designed into these breakers.

Arcing in a faulted AC circuit usually occurs sporadically in each half cycle of the voltage waveform. The complex arcing event causes sputtering arc's that vary the current from normal load patterns. The precursor to the arc may be a high resistance connection leading to a "glowing contact" and then a series arc, or a carbon track leading to line-to-line or parallel arcing. In a home circuit breaker equipped with Ground Fault Circuit Interrupter (GFCI), a carbon or moisture track can be detected early if the short is to ground. With the introduction of AFCI breakers, protection of arcing shorts from line-to-line, not involving ground, can also be detected and interrupted.

In our arc fault interrupter, the additional electronic devices monitor both the line voltage and current "signatures." In a normal operating circuit, common current fluctuations produce signatures which should not be mistaken for an arc. Starting currents, switching signatures and load changes (normal or "good arc" events) can be digitally programmed in the AFCI as normal signatures waveforms. Deviations or changes from these "normal" signatures are monitored by electronic circuits and algorithms to determine if arcing is occurring. When these arc fault signatures are recognized, the circuit is interrupted and power is removed. The speed of this detection as well as the arc magnitude can be programmable parameters at the time of manufacture. The particular signatures identified as arcs are part of the proprietary arc fault technology of Square D Company.

Commercial, UL approved AFCI circuit breakers are available commercially. These are now in the NEC and will be required in home bedroom circuits in 2002. Since the electrical loads in residential circuits can vary widely, they will be designed to allow for almost an infinite combination of electrical loads. Their AFCI programming will be combined with GFCI as well as magnetic and thermal overload components. They will be designed to form fit and function in place of standard residential circuit breakers.

Summarizing briefly, heat, arcs or electrical ignition are often caused by loose connections, broken or shorted wires in the power distribution system. In wiring, vibration, moisture temperature extremes, improper maintenance and repair all contribute to wiring failure. This leads to arcing and may ignite combustible components. Furthermore, carbon tracking caused by heat generated by the arc can deteriorate the wire insulation, exposing the conductors and resulting in intermittent short circuits between individual wires. These inter-wire shorts can cause damage and malfunctions. Elimination or reduction of these hazards with arc fault technology, which should become an industry-wide priority, is one aspect of the present invention.

OBJECTS AND SUMMARY OF THE INVENTION

It is a general object of the present invention to provide an improvement in an arc fault interrupter which reliably detects arc fault conditions which may be ignored by conventional circuit interrupters.

A more specific object of the invention is to provide an arc fault interrupter which creates an apparent ground fault upon arc detection so that an associated ground fault interrupter can be used to trip the circuit.

A related object of the invention is to provide an arc fault interrupter which utilizes a minimum number of highly reliable electronic components, so as to be relatively simple and yet highly reliable in operation.

Other and further objects and advantages of the invention will be apparent to those skilled in the art from the present specification taken with the accompanying drawings and appended claims.

In accordance with one aspect of the invention, there is provided a system for producing a simulated ground fault when arcing is present in an electrical circuit, comprising a sensor which monitors said electrical circuit, an arcing fault detection circuit which determines whether an arcing fault is present in response to said sensor and produces a trip signal in response to a determination that an arcing fault is present in said electrical circuit, and a ground fault simulator circuit for producing a simulated ground fault in response to said trip signal.

In accordance with another aspect of the invention, there is provided a method of producing a simulated ground fault when arcing is present in an electrical circuit comprising monitoring said electrical circuit and determining whether an arcing fault is present in said circuit, producing a trip signal in response to a determination that an arcing fault is present in said electrical circuit, and producing a simulated ground fault in response to said trip signal.

DESCRIPTION OF ILLUSTRATIVE EMBODIMENTS

Figure 1:
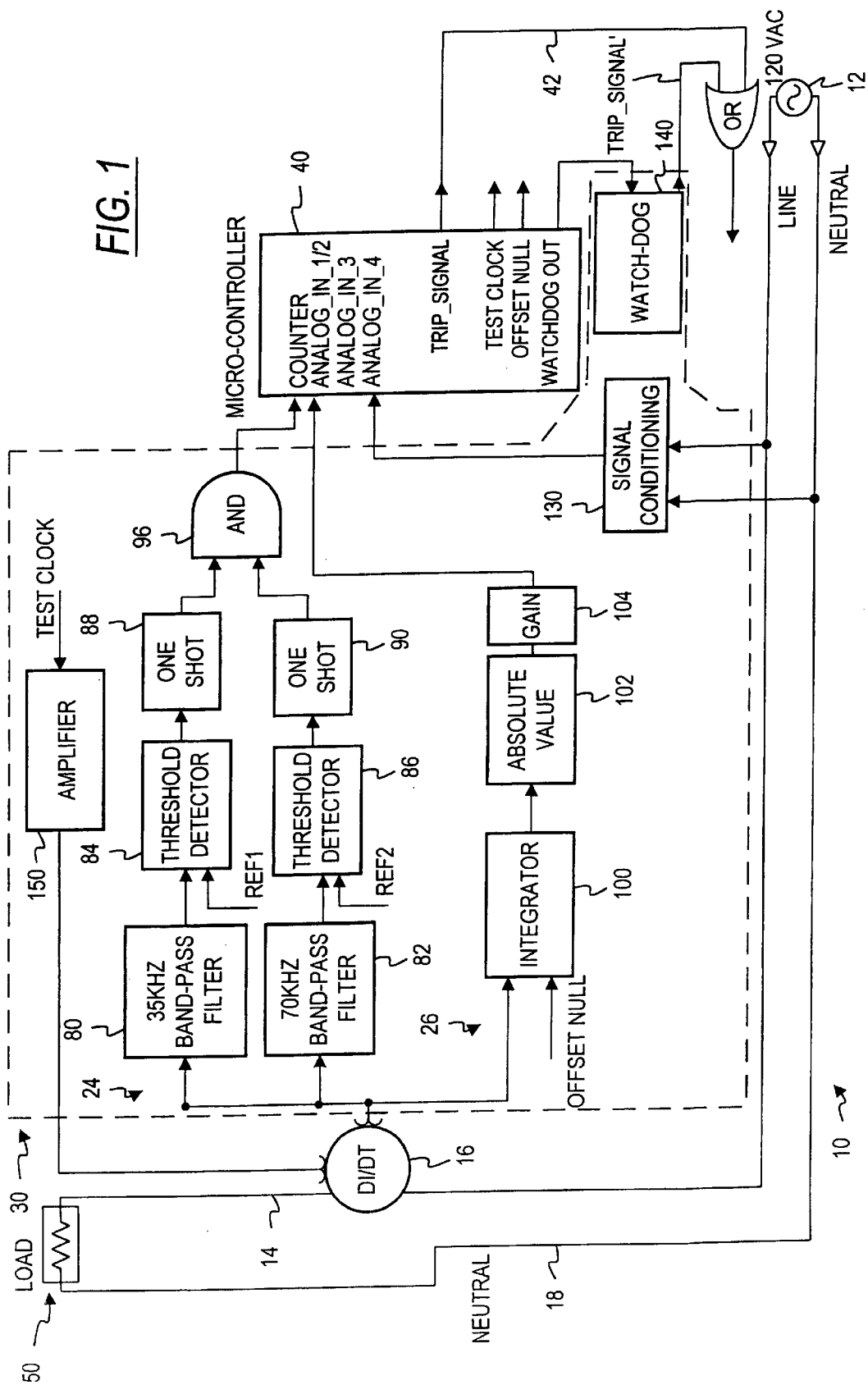
FIG. 1 is a functional block diagram of one type of arc fault detection apparatus which may be used with the invention.

Referring now to the drawings in initially to FIG. 1, there is shown in block form a novel electrical fault detector system in accordance with one embodiment of the invention, and designated generally by the reference numeral 10. In the illustrative example, the fault detection system 10 is associated with an electrical circuit such as a 120 VAC circuit 12 which is to be monitored for faults. Of course, the invention is not limited to use with a 120 VAC circuit. At least one sensor 16 is provided in association with the 120 VAC circuit 12 for producing a signal representative of a signal condition, such as power, voltage or current in the 120 VAC circuit 12. In the illustrated embodiment, this sensor 16 comprises a current rate of change (di/dt) sensor. A line conductor 14 of the 120 VAC circuit 12 passes through the rate of change (di/dt) sensor 16 which produces a current input signal representative of the rate of change of current flow in the line conductor 14.

The di/dt sensor 16 may comprise a toroidal coil having an annular core which surrounds the line conductor 14, with a toroidal sensing coil wound helically on the core. In the sensor 16, the core may be made of magnetic material such as ferrite, iron or molded permeable powder, such that the sensor is capable of responding to rapid changes in flux. An air gap may be cut into the core in certain instances to reduce the permeability, and the core material is such that it does not saturate during the relatively high current produced by some forms of arcing, so that arc detection is still possible.

The di/dt sensor 16 provides an input to an arcing fault detector circuit 24 such as a broadband noise detector circuit and a current fault detector circuit 26 such as a current measuring circuit. In the illustrated embodiment, all of the components of the arcing fault circuit detector 24, the current fault detector circuit 26, as well as some other circuit components to be described later, are provided on an application specific integrated circuit (ASIC) 30. Suitable output signals from the ASIC 30 are fed to a microcontroller 40 which, based on analysis and further processing of the signals provided by the ASIC 30 makes a decision as to whether to send a trip signal to an output 42.

Referring still to FIG. 1, additional components of the ASIC 30 will next be described.

The broadband noise detector 24 comprises first and second band-pass filter circuits 80, 82 which receive the rate of change of current signal from the di/dt sensor 16. The band passes of these circuits 80 and 82 are selected at frequency bands which are representative of broadband noise typical of arcing faults. In the illustrative embodiment, these band-pass frequencies are selected as typically 35 kilohertz and 70 kilohertz respectively. Each of the band-pass filter circuits 80 and 82 feeds a filtered signal, comprising those components of an input signal from the di/dt sensor which fall within their respective band-pass frequency pass bands, to respective threshold detector circuits 84 and 86.

The threshold detectors 84 and 86 are responsive to those components of the frequency signals passed by the band-pass filters 80 and 82 which are above a predetermined threshold amplitude for producing a corresponding frequency amplitude output to signal conditioning circuits 88 and 90. These circuits 88 and 90 produce a conditioned output signal in a form suitable for input into the microcontroller 40. In the illustrative embodiment, these latter signal conditioning circuits 88 and 90 comprise ten microsecond one-shot circuits for producing a unit pulse signal. The output pulses generated by the one-shots 88 and 90 are ANDed at an AND circuit 96 whose output is fed to a "counter" input of the microcontroller 40 as indicated in FIG. 1. In the illustrative embodiment, a one volt threshold is utilized by both of the threshold circuits 84 and 86.

Referring still to FIG. 1, the current fault sensor or current measuring portion 26 of the ASIC 30 also receives the output signal of the di/dt sensor 16. An integrator circuit 100 develops a signal representative of current magnitude in response to the output of the di/dt sensor 16. This signal is fed to a further signal conditioning circuit portion 102 which includes an absolute value circuit as shown in FIG. 1 and a gain circuit 104 for producing a conditioned current output signal in a form suitable for input to the controller 40.

The absolute value circuit 102 takes signals that are both negative- and positive-going and inverts any negative going signals to positive signals while passing through positive-going signals unchanged.

The output of the absolute value circuit 102 is fed into the gain circuit 104 which in one embodiment includes a low current gain stage and a high current gain stage. Briefly, the low current gain stage applies a relatively greater amount of gain to relatively low currents so as to increase the resolution of the current signal for relatively low current levels. On the other hand, the high current gain stage applies a relatively lower gain to relatively higher current levels in order to maintain a full range of current signal levels through the circuit. The outputs of the respective low current and high current gain stages are fed to the microcontroller 40.

The line voltage is also conditioned at a circuit 130 and fed to the microcontroller for further analysis and processing. This circuit 130 includes a line voltage divider (not shown) which divides the line voltage to a lower level suitable for further processing, a difference amplifier (not shown) which takes the output of the line voltage divider and level shifts it to circuit ground to be rectified. and an absolute value circuit. The voltage from the difference amplifier (not shown) is fed through the absolute value circuit which has the same configuration and function as described above for the previously described absolute value circuits. The output of signal conditioning circuit 130 is fed to the microcontroller 40.

Referring still to FIG. 1, a watchdog circuit 140 takes a pulse input (Pulse_In) from the microcontroller 40 to check to see if the microcontroller is still active. If no pulses are present on this output from the microcontroller then a trip signal (Trip_Signal) is sent to the trip circuit by an output 142 of the watchdog circuit 140. An additional OR gate 144 may receive the outputs 42 and 142 and OR them onto a single trip signal output 146.

A "push to test" amplifier circuit 150 receives a "test clock" signal from the microcontroller when a "push to test" switch (not shown) is actuated and conditions it for input to a test winding on the di/dt sensor 16. If all of the circuitry operates properly, the microcontroller should receive back signals indicating an arcing fault. In accordance with a test program when these signals are received, the microcontroller will produce a "trip" signal on line 42.

As indicated above, FIG. 1 illustrates one embodiment of an application specific integrated circuit for performing the above-described operations. Further details of the construction and operation of the circuit of FIG. 1 are described copending application, Ser. No. 09/026,193, filed Feb. 19, 1998 (attorney's docket NBD27/SQRE020), which is incorporated herein by reference.

Provision of the detector circuit as an ASIC is advantageous, in that it permits the circuitry to be readily incorporated into a variety of environments. This is mainly due to the small size and relatively modest power requirements of the ASIC. That is, this detector circuit can be incorporated not only in panel boards or other distribution apparatus, but could also be located at individual loads. This is true for industrial, as well as and commercial and residential applications. For example, the detector circuit ASIC could be incorporated in electrically powered industrial and/or commercial equipment or machinery, as well as in consumer products such as computers, audiovisual equipment, appliances or the like.

One embodiment of the invention analyzes current waveforms and broadband noise to determine if arcing is present in electrical conductors. A high current arc is identified as a current waveform that has a combination of changes in current (di/dt) and broadband noise (10 kHz to 100 kHz). The controller 40 increments a plurality of counters, which may be implemented in software, in accordance with the input signals received from the ASIC 30. A detailed description of how the controller determines if an arc is present is described in copending application Ser. No. 09/129,685, filed Aug. 5, 1998 (attorney's docket NBD27-1/SQRE171) and incorporated herein by reference.

The above-described arcing fault detection circuit is but one form of detection circuits which may be used in connection with the present invention. Arcing fault detection circuits of other types may be used without departing from the invention. For purposes of the present invention, it is sufficient that the arc fault detection scheme utilized detect arcing in the monitored circuit or circuits and produce a usable output or "trip" signal when an arcing fault is detected. The arc fault detection circuit 10 may be located in an electrical outlet box or receptacle (see FIG. 3), or in a junction box, or other household electrical system component or element, as well as in an electrical device such as an extension cord, an appliance, or the like, connected or connectable to a household electrical system.

While the above-referenced copending patent applications describe an arcing fault detection system which is combined with a ground fault detection element and circuitry, the present invention also contemplates provision of a separate ground fault circuit interrupter device or mechanism. Thus, in accordance with the present invention, when the arcing fault detection circuit 10 produces an output or trip signal (for example at output 146) indicating the presence of an arcing fault (or triggerring of the watch-dog circuit 140), a simulated or pseudo-ground fault is created which would then be detected by a ground fault circuit interrupter (GFCI). This GFCI may be located in the same outlet or other device as the arc fault detection circuit 10, or in a ground fault protected outlet which is "upstream" (that is, on the line side) of the location of the arcing fault detection circuits of the invention, or at a ground fault interrupter which is part of a breaker located in a distribution panel or breaker box upstream of the arc fault detection circuits, as shown in FIG. 3, for example.

In the event that the arcing fault selection and simulated ground fault circuits of the invention are located in an electrical receptacle, outlet, or other electrical device, or in a junction box or receptacle box in an electrical system, the present invention minimizes the space occupied by the arcing fault apparatus. For example, the present invention does not require additional contacts and electrical/mechanical devices for making and breaking the contacts, or test or clearing mechanisms, reset mechanisms, and the like within the same outlet, receptacle, etc. as the arc fault detection circuitry. Rather, the existing tripping, reset and test mechanisms in an existing ground fault interrupter receptacle or a ground fault interrupter breaker would be utilized, in cooperation with the present invention, for tripping and resetting the circuit upon detection of the arcing fault. These GFCI components could be located in the same receptacle, in cases wherein the arcing fault components are located in a receptacle, or in a separate receptacle, or at the distribution panel, as mentioned above.

Figure 2:
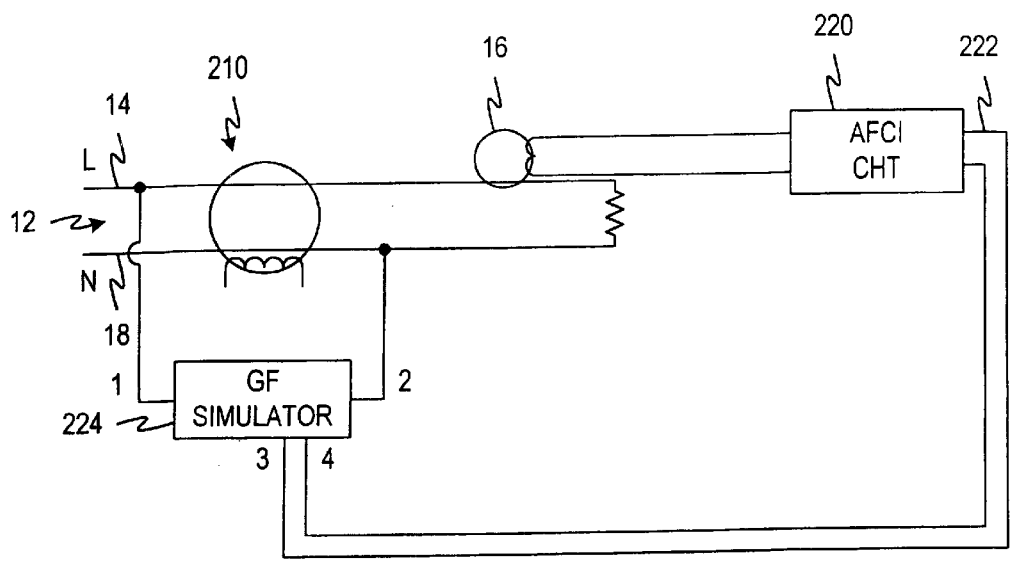
FIG. 2 is a circuit schematic, partially in block form, showing apparatus in accordance with one form of the invention.
Figure 4:
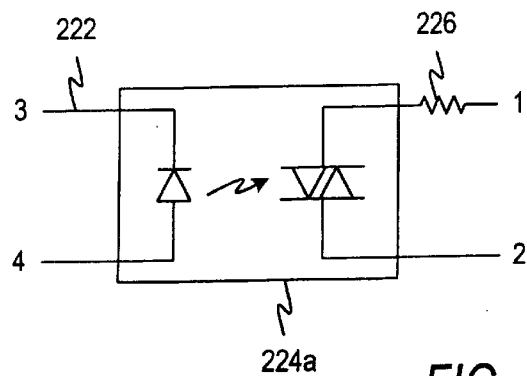
FIGS. 4–7 show various embodiments of a ground fault simulator circuit which may be used in the present invention.
Figure 5:
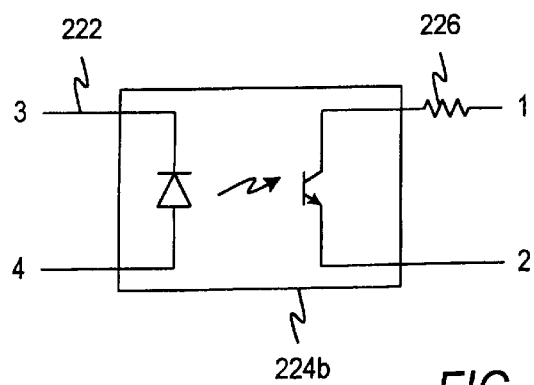

In this latter regard, reference is invited to FIGS. 2–7, wherein further aspects of the invention are illustrated. In FIG. 2, a circuit 12 comprising line (L) and neutral (N) conductors 14, 18 and having a ground fault sensing coil or current transformer 210. is illustrated in connection with arcing fault detecting sensor coil or current transformer 16 and its associated arc fault circuit interrupter circuitry 220 which includes the arcing fault detection circuit 10 described above, or other suitable circuitry for producing a trip output signal on an output 222 in response to detection of an arcing fault. The signal at the trip output 222 feeds an input of a ground fault simulator circuit 224 which may take any of a number of forms, and produces a ground fault signal which will be detected by the ground fault current transformer 210, which may be located in the same receptacle or in a separate GFCI receptacle or in a GFCI breaker at the distribution panel or breaker box, as mentioned above.

Figure 3:
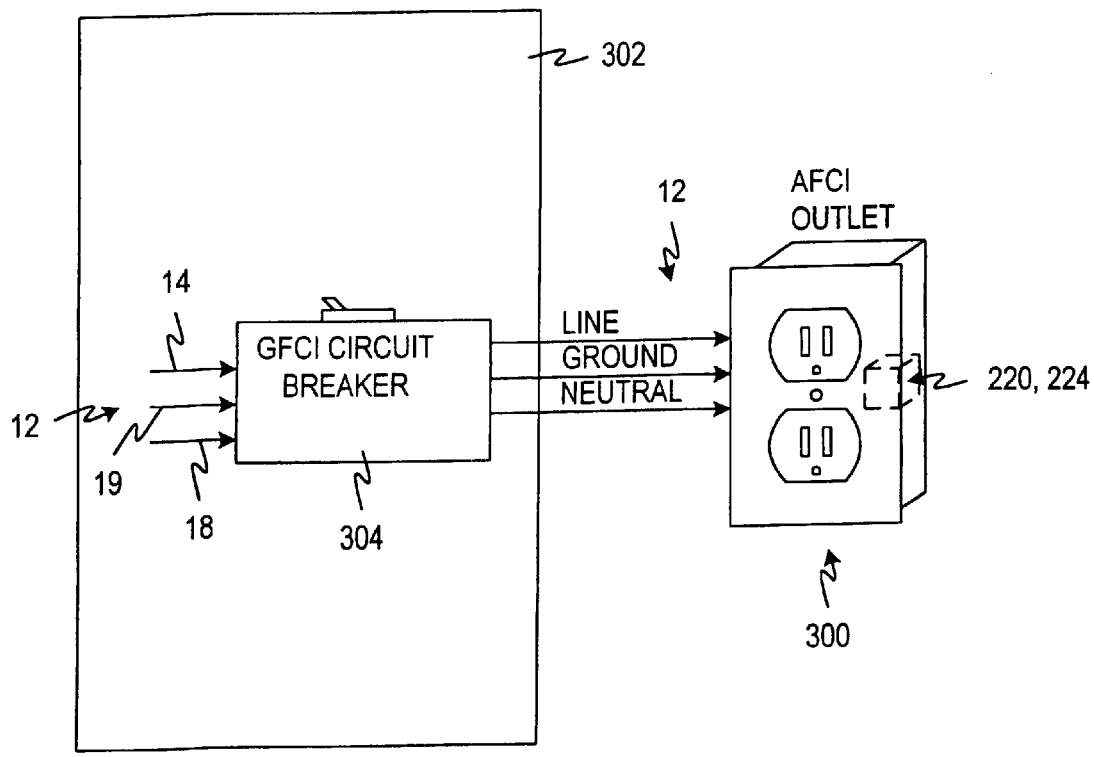
FIG. 3 is a simplified diagram showing an arc fault circuit interrupter outlet operatively coupled with a ground fault circuit interrupter in a distribution panel, in accordance with one form of the invention.
Figure 6:
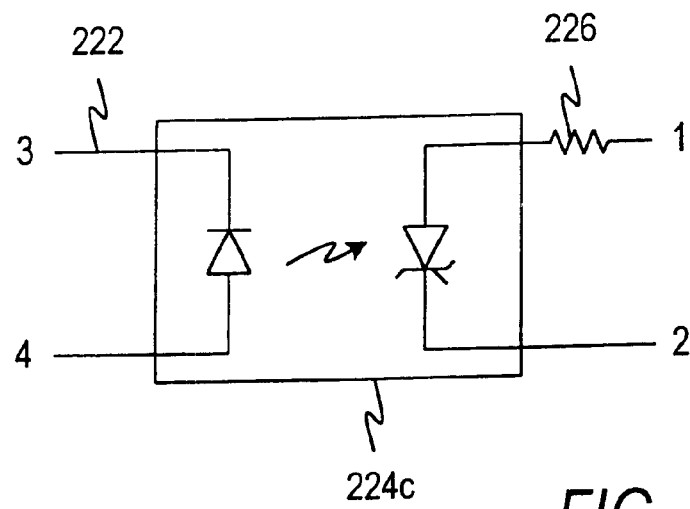
Figure 7:
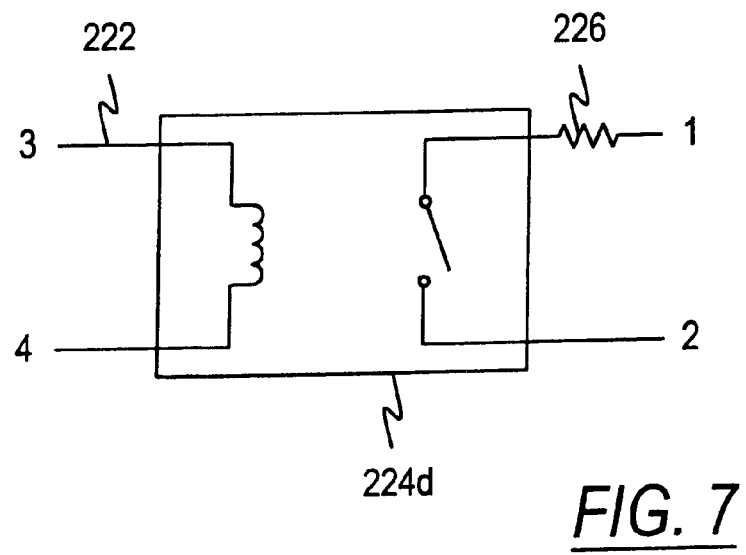

Referring briefly to FIG. 3, an embodiment of the invention is illustrated in which an arcing fault protected electrical outlet or receptacle 300 is provided with the AFCI circuit 220 and ground fault simulator circuit 224 described above with reference to FIG. 2. These elements 220, 224 may be mounted to the receptacle itself, or to the electrical box which mounts the receptacle. Respective netural and line conductors 14, 18 and, a ground conductor 19 are delivered to the AFCI outlet 300 from a distribution panel 302 at a remote location, in accordance with conventional household wiring practices. At the distribution panel 302, a ground fault circuit interrupter (GFCI) or ground fault protected circuit breaker 304 is provided. As described above with reference to FIG. 2, the AFCI circuit at the receptacle or outlet 300, upon detecting an arcing fault, produces a simulated ground fault on the circuit 12 which will be detected by the GFCI circuit breaker 304 in the distribution panel 302. In the embodiment illustrated in FIG. 3, the GFCI circuit breaker 304 is associated with a branch circuit comprising the circuit 12.

Specific examples of a ground fault simulator circuit are shown in FIGS. 4–7, however, the invention is not limited to these examples. Any circuit or other device(s) which produces a suitable simulated ground fault which can be detected by the ground fault current transformer 210 may be utilized. In the examples given in FIGS. 4–7, as further described below, the circuit 224 electrically isolates the arcing fault circuit 220 from the monitored circuit 12 including the neutral and line conductors 14, 18. Circuits for doing this are shown respectively in FIGS. 4–7 and include an opto-triac circuit 224a, an opto-transistor 224b, an opto-SCR 224c and a relay 224d. One of these circuits or an equivalent circuit simulates a ground fault between the line conductor 14 and neutral conductor 18 of the circuit 12 which can be detected by the ground fault current transformer 210 located upstream from the arcing fault sensor 16. A resistor 226 may be selected to set a ground fault current level.

As yet another alternative, the arc fault detector or sensor 16 and circuits 220 and 224 shown and described in connection with FIG. 2 could be installed in a ground fault protected outlet, using the indicated connections relative to the ground fault current transformer or other ground fault sensing or detecting element, and utilizing the existing circuit interruption, resetting and test capabilities of the ground fault protected receptacle for arcing fault protection, all in the same outlet or receptacle.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A system for producing a simulated ground fault when arcing is present in an electrical circuit, comprising:
   a sensor which monitors said electrical circuit,
   an arcing fault detection circuit which determines whether an arcing fault is present in said electrical circuit in response to said sensor and produces a trip signal in response to a determination that an arcing fault is present in said electrical circuit,
   a ground fault simulator circuit which produces a simulated ground fault in response to said trip signal;
   wherein said sensor detects a current in said electrical circuit and develops a corresponding sensor signal, wherein said arcing fault detection circuit comprises a circuit which determines the presence of broadband noise in said sensor signal and produces a corresponding output signal, and a controller which processes said sensor signal and said output signal in a predetermined fashion to determine whether an arcing fault is present in said electrical circuit and
   wherein the controller implements a plurality of counters and increments said plurality of counters in a predetermined fashion in accordance with said sensor signal and said output signal, and periodically determines whether an arcing fault is present based at least in part on the state of said plurality of counters.

2. The system of claim 1 wherein said counters are implemented in software.

3. The system of claim 1 wherein said ground fault simulator circuit has an input for receiving said trip signal and an output for producing said simulated ground fault, and wherein said output is electrically isolated from said input.

4. The system of claim 3 wherein said ground fault simulator circuit comprises a relay.

5. The system of claim 3 wherein said ground fault simulator circuit comprises an opto-isolator.

6. The system of claim 5 wherein said opto-isolator includes an opto-triac.

7. The system of claim 5 wherein said opto-isolator includes an opto-transistor.

8. The system of claim 5 wherein said opto-isolator comprises an opto-SCR.

9. A method of producing a simulated ground fault when arcing is present in an electrical circuit comprising:
   monitoring said electrical circuit and determining whether an arcing fault is present in sad circuit;
   producing a trip signal in response to a determination that an arcing fault is present in said electrical circuit;
   producing a simulated ground fault in response to said trip signal;
   wherein the monitoring and determining include sensing a current in the electrical circuit and developing a corresponding sensor signal, determining the presence of broadband noise in said sensor signal and producing a corresponding output signal and processing said sensor signal and said output signal in a predetermined fashion to determine whether an arcing fault is present in said electrical circuit; and
   wherein said processing includes incrementing a plurality of counters in a predetermined fashion in accordance with said sensor signal and said output signal, and periodically determining whether an arcing fault is present based at least in part on the state of said plurality of counters.

10. The method of claim 9 and further including implementing said plurality of counters in software.

11. The method of claim 9 wherein producing a simulated ground fault includes electrically isolating said simulated ground fault from said trip signal.

* * * * *